US008313361B2

(12) United States Patent
Flickinger et al.

(10) Patent No.: US 8,313,361 B2
(45) Date of Patent: Nov. 20, 2012

(54) HELICAL BAR CONCAVE (75) Inventors: Wayne T. Flickinger, Oxford, PA (US); Herbert M. Farley, Elizabethtown, PA (US); Jonathan E. Ricketts, Ephrata, PA (US); Joshua D. Werning, Mt. Wolf, PA (US)

(73) Assignee: CNH America LLC, New Holland, PA (US)

( * ) Notice: Subject to any disclaimer, the term of this patent is extended or adjusted under 35 U.S.C. 154(b) by 357 days.

(21) Appl. No.: 12/635,949

(22) Filed: Dec. 11, 2009

(65) Prior Publication Data
US 2011/0143827 A1 Jun. 16, 2011

(51) Int. Cl.
*A01F 12/24* (2006.01)
(52) U.S. Cl. ........................................ 460/110; 460/109
(58) Field of Classification Search .................. 460/110, 460/109, 76, 71, 73, 13, 72, 107, 69; D15/28
See application file for complete search history.

(56) References Cited

U.S. PATENT DOCUMENTS

| 132,017 | A | | 10/1872 | Bailey | |
|---|---|---|---|---|---|
| 1,570,898 | A | | 1/1926 | Landis | |
| 2,321,019 | A | | 6/1943 | Dray | |
| 2,771,077 | A | | 11/1956 | Karlsson et al. | |
| 3,515,145 | A | * | 6/1970 | Herbsthofer | 460/110 |
| 3,678,938 | A | * | 7/1972 | De Coene | 460/73 |
| 3,946,746 | A | * | 3/1976 | Decoene et al. | 460/73 |
| 4,075,823 | A | | 2/1978 | Rowland-Hill | |
| 4,378,024 | A | * | 3/1983 | De Busscher et al. | 460/73 |
| 4,497,328 | A | * | 2/1985 | Alm et al. | 460/110 |
| RE31,860 | E | * | 4/1985 | Decoene et al. | 460/75 |
| 4,606,355 | A | * | 8/1986 | Dammann | 460/69 |
| 4,909,772 | A | * | 3/1990 | Kuchar | 460/71 |
| 5,024,631 | A | * | 6/1991 | Heidjann et al. | 460/75 |
| 5,057,056 | A | * | 10/1991 | Kambeitz | 460/110 |
| 5,489,239 | A | * | 2/1996 | Matousek et al. | 460/62 |
| 5,569,080 | A | * | 10/1996 | Estes | 460/72 |
| 5,613,907 | A | * | 3/1997 | Harden | 460/109 |
| 5,816,911 | A | * | 10/1998 | Dwyer | 460/71 |
| 6,074,297 | A | * | 6/2000 | Kuchar | 460/46 |
| 6,193,604 | B1 | * | 2/2001 | Ramp et al. | 460/110 |
| 6,358,142 | B1 | * | 3/2002 | Imel et al. | 460/109 |
| 6,447,394 | B1 | | 9/2002 | Gryspeerdt | |
| 6,500,063 | B1 | | 12/2002 | Gryspeerdt | |
| 6,530,833 | B2 | | 3/2003 | Imel et al. | |
| 6,537,148 | B2 | * | 3/2003 | Schwersmann | 460/107 |
| 7,059,961 | B2 | | 6/2006 | Schenk | |
| 7,118,475 | B2 | | 10/2006 | Schenk | |
| 7,166,026 | B2 | | 1/2007 | Ricketts et al. | |

(Continued)

FOREIGN PATENT DOCUMENTS
FR        2570573        3/1986
(Continued)

*Primary Examiner* — Arpad Fabian-Kovacs
(74) *Attorney, Agent, or Firm* — Michael G. Harms (57) ABSTRACT

A helical bar concave including a grate having helical mounting framework and helical cutouts to form a percent open area having a helical geometry. Configurable and segmented rub bars are mounted in a helical fashion to a cylindrical helical surface of the grate. The helical geometry in combination with configurable rub bars mounted in a helical fashion results in a configurable helical bar concave in which the number or aggressiveness of the threshing surface on the inside radius of the grate may be changed and/or the rub bars may be moved to the outside of the grate to change the percent open area and hence the separation characteristics of the concave.

18 Claims, 4 Drawing Sheets

U.S. PATENT DOCUMENTS

| | | |
|---|---|---|
| 7,226,355 B2 | 6/2007 | Schenk |
| 7,749,055 B2 * | 7/2010 | Ricketts .................. 460/108 |
| D624,939 S * | 10/2010 | Flickinger et al. ............ D15/28 |
| 2008/0293462 A1 | 11/2008 | Farley et al. |

FOREIGN PATENT DOCUMENTS

| | | |
|---|---|---|
| JP | 2000333525 | 12/2000 |
| JP | 2004313026 | 11/2004 |

* cited by examiner

HELICAL BAR CONCAVE

TECHNOLOGY FIELD

The present invention relates generally to agricultural harvesters, and more particularly, to a helical bar concave for use with an axial flow harvester having a threshing and separating unit with a rotor for advancing crop material along a generally helical path.

BACKGROUND

A combine harvester is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, and flax or linseed. The waste (e.g., straw) left behind on the field includes the remaining dried stems and leaves of the crop having limited nutrients which may be, for example, chopped and spread on the field or baled for feed and bedding for livestock.

The cut crop may be picked up and fed into the threshing and separating mechanism of the combine, typically consisting of a rotating threshing drum to which grooved steel bars may be bolted. These bars thresh or separate the grains and chaff from the straw through the action of the drum against the concaves, i.e., shaped "half drum," that may also be fitted with steel bars and a meshed grill, through which grain, chaff and smaller debris may fall, whereas the straw, being too big or long, is carried through to the outlet. Typically, the drum speed may be variably adjustable and the distance between the drum and concave may be finely adjustable laterally and together, to achieve optimum separation and output.

In an axial flow combine, the harvested crop is threshed and separated as it is conveyed between a longitudinally arranged rotor and the inner surface of an associated chamber comprising threshing and separating concaves. The crop material spirals and is conveyed along a helical path along the inner surface of the chamber until it reaches the end thereof for expulsion out of the rear of the combine. In other embodiments, the combine may include a threshing design that is positioned transversely in a combine Even though the crop flow spirals and follows a helical path as the crop is pulled through the rotor, historically and up until somewhat recently, all of the rub bars of the concave were straight and perpendicular with the side sheet (side walls) of the weldment of the concave frame. More recently, concaves have incorporated angled cross or rub bars so that the bars are more perpendicular to the crop flow to increase the likely expulsion of grain through the concave, and to increase the aggressiveness of the concave on the crop. These angle rub bars extend fully across the width of the concave.

Conventional concaves are of a welded construction. For example, a typical welded construction of a concave may include welded rub bars that may form a helical shape relative to the parallel side bars (wires) and frame side walls and are of various lengths depending on their position on the concave. The rub bars extend fully from a side or edge of the concave to another side or edge. As such, these conventional welded concaves have multiple part numbers involved and there is a detailed and intricate weld fixturing required to physically position these bars appropriately in a helical fashion. Conventional welded construction used to produce the helical shape is very time and cost intensive.

As can be appreciated by one of ordinary skill in the art, there is a tremendous amount of weld joints on each part and the weld process introduces heat and distortion on the concave. The concave is somewhat of a precision part typically requiring manufacturing and installation precision within millimeters of the radius, i.e. an internal radius of these parts. Welding may end up distorting the part and causing the part to be out of desired manufacturing tolerances.

What is needed is an improved helical bar concave and method of making a helical bar concave that solve one or more of the above problems with conventional concaves.

SUMMARY

Embodiments of the present invention address and overcome one or more of the above shortcomings and drawbacks, by providing a helical bar concave and a low cost and easy method of manufacturing a helical bar concave. This technology is particularly well-suited for, but by no means limited to, use with an axial flow harvester having a threshing and separating unit with a longitudinally arranged rotor for advancing crop material along a generally helical path.

Embodiments of the present invention are directed to a helical bar concave including a frame having two side walls and two end walls connected together to define a top opening. A radius is provided in a top edge of the side walls. A grate is connected to the top edges of the side walls and end walls, and over the top opening of the frame. The grate having an inside radius conforming to the radius of the top edges of the side walls. The grate includes a functional surface on its interior surface for contacting a crop. A plurality of helical cutouts in the grate defining a percent open area having a helical geometry. The grate includes helical mounting framework separating the cutouts. The helical geometry of the helical cutouts and helical mounting framework is generally in the same direction, and parallel to a flow path of a spiraling crop flow when, for example, the helical bar concave is mounted in a threshing and separation system of a combine. A plurality of rub bars are mounted to a surface of the grate and connected to the mounting framework. The rub bars are mounted to the grate in a helical fashion—meaning the rub bars are mounted such that a length of each of the rub bars is substantially perpendicular to the helical cutouts and helical mounting framework.

According to one aspect of the invention, the rub bars comprise configurable rub bars that may be mounted to one or both of: the interior surface to create a rub surface; and/or an exterior surface of the grate to cover-up one or more cutouts and reduce the percent open area of the grate.

According to another aspect of the invention, holes are formed (e.g., cut or drilled) in the mounting frames and corresponding holes are formed (e.g., cut or drilled) in the rub bars. Fasteners may extend through the holes in the mounting frames and the holes in the rub bars to connect the rub bars to the grate. In some embodiments, the fasteners comprise bolts and nuts.

According to one aspect of the invention, the rub bars comprise segmented rub bars. The segmented rub bars including a straight piece having a length that does not span the width of the concave allowing the segmented straight rub bar to be mounted to a substantially circumferential helical surface of the grate in a helical fashion without bending or twisting of the rub bar or grate. In some embodiments, the segmented rub bars may span only span two mounting frames. In some embodiments, the segmented rub bars only span three mounting frames.

In another aspect of the invention, the rub bars comprise U-shaped rub bars having a rectangular shaped channel having two side edges and two ends, and two upset edges extending at an angle from the side edges of the channel. In another embodiment, the rub bars comprise L-shaped rub bars. In another embodiment, the rub bars comprise rectangular shaped rub bars. In another embodiment, the rub bars comprise fingers extending upward from the rub bar.

According to another embodiment of the invention, the improved helical bar concave is used with an agricultural combine. The agricultural combine includes an axially arranged threshing and separation system. A threshing chamber extends axially within the threshing and separation system. A cylindrical threshing rotor is supported and rotatable in a predetermined direction about a rotational axis in the threshing and separation system for conveying a flow of crop material in a helical flow path through the threshing chamber extending circumferentially around the rotor. Helical bar concaves extend circumferentially around a portion of the rotor in a spaced apart relationship to allow the flow of crop to pass in the space between the spinning rotor and the concaves. The helical bar concaves include a frame having walls defining a top opening. A grate is connected over the top opening of the frame, the grate having an inside radius that substantially conforms to the curvature of the rotor. A functional surface is provided on the interior surface of the grate for contacting a crop. Helical cutouts in the grate define a percent open area having a helical geometry. Helical mounting frames in the grate separate the cutouts. When the helical bar concave is mounted in the threshing and separation system, the helical geometry of the helical cutouts and helical mounting framework is generally in the same direction, and parallel to a flow path of a spiraling crop flow. Rub bars are mounted to a surface of the grate and connected to the mounting frames. The rub bars are mounted to the grate in a helical fashion—meaning that the rub bars are mounted such that a length of each of the rub bars is substantially perpendicular to the helical cutouts and helical mounting framework.

According to another embodiment of the invention, a low cost and easy method of manufacturing the helical bar concave is provided. The improved method of manufacturing a helical bar concave comprising: a laser cutting flat metal sheet to form a grate having a helical pattern, the helical pattern includes a plurality of helical mounting framework and helical cutouts in the grate; the cutouts in part forming a percent open area in the concave having a helical geometry; cutting mounting holes in the mounting framework of the grate; rolling the flat, cut, metal grate to a predetermined radius; connecting the cut, rolled metal grate to a box-shaped frame; connecting rub bars to an interior surface of the grate to form a functional surface for threshing a crop, the rub bars being mounted in a helical fashion meaning that the rub bars are mounted such that a length of each of the rub bars is substantially perpendicular to the helical cutouts and helical mounting framework.

In another aspect of the invention, the connecting of the rub bars to the grate comprises a bolted configuration in which the rub bars may be easily unbolted, moved to another location on the grate, and bolted in place in the new location. The method allows for selectively configuring the rub bars on the helical grate by mounting the configurable rub bars in a helical fashion to one or both of the interior surface and/or an exterior surface of the grate.

In another aspect of the invention, the rub bars are formed as segmented rub bars. The segmented rub bars comprising straight pieces having a length that does not span the width of the box-shaped frame of the concave, the segmented rub bars allowing the rub bars to be mounted to a curved surface of the grate in a helical fashion without bending or twisting of the rub bar or grate.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The above problems in the prior art have motivated the creation of a helical bar concave. Laser cut construction of the grate having helical cutouts provides a low cost and easy to manufacture part. Segmented rub bars allow rub bars to be mounted in a helical fashion to a substantially circumferential helical surface resulting in more aggressive threshing. Bolted rub bar construction allows the concave to be configurable. In preferred embodiments, the present invention is directed to a concave having helically positioned segmented rub bars in combination with the helical nature of the grate cutouts and percent open area geometry. The helical bar concave is particularly well suited, but in no way limited, for use with an axial flow combine and the helical design and construction of the concave provides improved threshing and separation of spiraling crop materials being conveyed through the combine.

Figure 1:
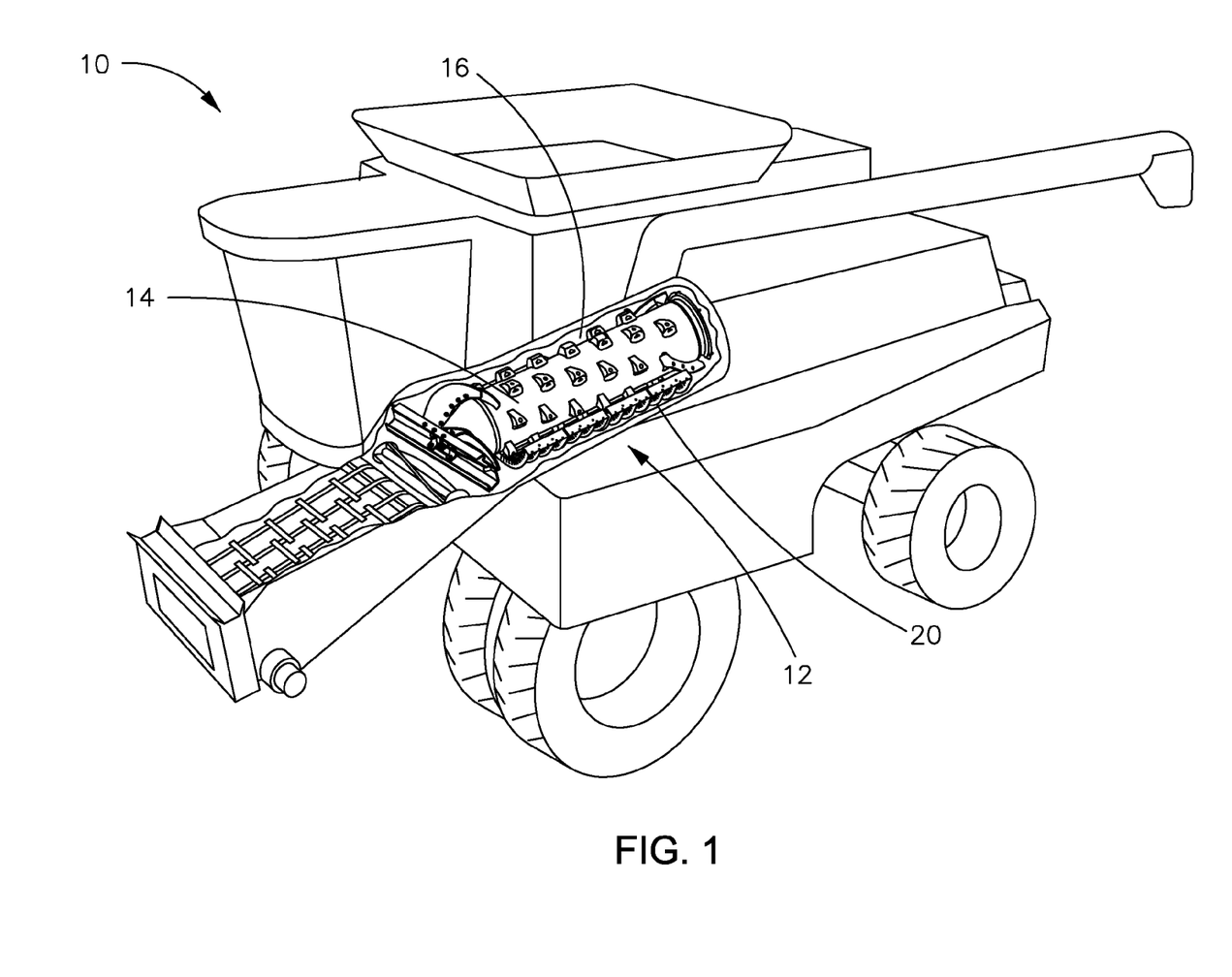
FIG. 1 is a perspective view of a combine harvester showing a partial cut-away in the area of the threshing and separating mechanism.

FIG. 1 shows an exemplary agricultural combine 10. As shown in FIG. 1, the combine 10 includes a longitudinally axially arranged threshing and separation system 12, all of which, except for the improved helical bar concave 20 that is the subject of the present invention and which is included within the threshing and separation system 12, are of well known construction and operation. The helical bar concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concaves 20 may extend circumferentially around the rotor 14 and the flow of crop may pass in the space between the spinning rotor and the concaves. As the crop material flow through the threshing and separation system 12, the crop material including, for example, grain, straw, legumes, and the like, will be loosened and separated from crop residue or waste such as, for example, husks, cobs, pods, and the like, and the separated materials may be carried away from the threshing and separation system 12 in a well known conventional manner.

Figure 2:
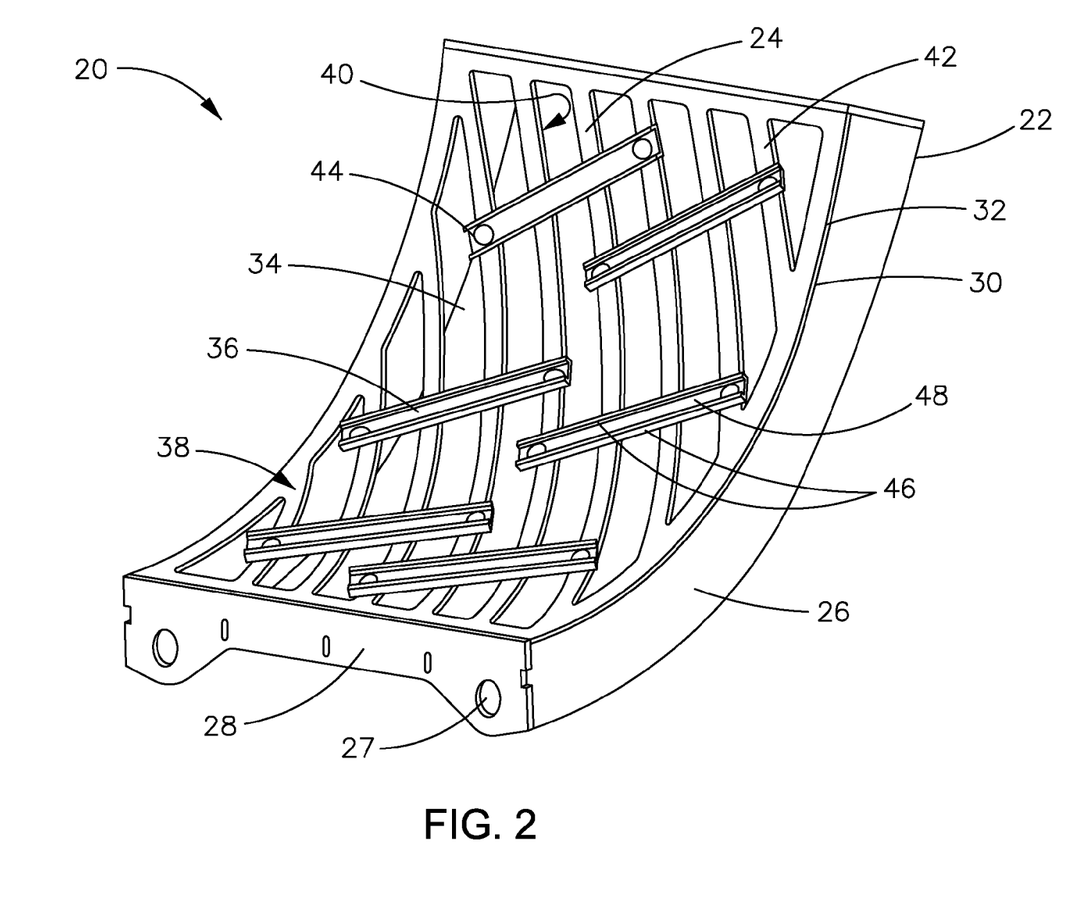
FIG. 2 is a detailed view of a helical bar concave that may be used in the threshing and separating mechanism of FIG. 1.

FIG. 2 shows an exemplary helical bar concave 20. As shown in FIG. 2, the helical bar concave includes a frame 22 mounted to a grate 24. As shown, the frame 22 includes side walls 26 and end walls 28 extending between and connected to the two side walls 26. The side walls 26 include a curved top edge 30 having a predetermined radius. The side walls 26 and end walls 28 define a top opening 32.

As shown in FIG. 2, the grate 24 includes a plurality of cutouts (openings) 34 and a plurality of rub bars 36. The grate 24 is connected (e.g., welded) over the top opening 32 in the frame 22. The grate 24 includes an inside radius corresponding to the radius of the curved top edge 30 of the side walls 24. The radius is measured from the longitudinal axis of rotation of the rotor and substantially corresponds to the curvature of an outer circumference of the rotor 14. The grate 24 includes an interior surface 38 (also referred to inside surface or top surface) and an exterior surface 40 (also referred to outside surface or bottom surface). The interior surface 38 comprising a concave functional surface for contacting a crop.

As shown, the cutouts 34 and rub bars 36 form a substantially circumferential helical surface. The helical nature of the cutouts define a percent open area having a helical geometry. In the illustrated embodiment, balloon helical cutouts are provided although varying shapes and sizes for the cutouts are contemplated providing a general helical configuration is included. The grate includes corresponding helical mounting framework or mounting frames 42 in the concave's functional surface separating the cutouts 34. As shown, the grate 24 also includes holes 44 in the mounting framework 42 for mounting the rub bars 36 to the grate 24.

The helical geometry or configuration of the mounting framework 42 is generally in the same direction, and parallel to the spiraling crop flow. Mounting framework 42 may be generally configurable at the time of construction (e.g., at the time of laser cutting) and the mounting framework 42 may be of various sizes depending on the crop to be separated. Mounting framework 42 and cutouts 34 may be used to set the hole spacing or govern the percent open area or free space in which the threshed grain can fall through the concave.

Generally, the larger the crop or kernel being threshed, the larger the percentage open area desired. For example, if a head of wheat being threshed is three inches long and the head is broken in half, you don't want it to fall through because it is not fully threshed. What you want to do is get all the kernels of wheat rubbed out of the head before it falls through to the cleaning system. As such, mounting framework 42 and cutouts 34 may include various sizes depending on the concave product.

Mounting framework 42 and cutouts 34 on a concave may include a staggered mix of various sizes and/or shapes to effect and govern the percent open area. The height of the mounting framework 42, which is essentially the material of a flat sheet of metal left after cutting the cutouts 34, is set below the height of the rub bars 36. For example, the rub bars 36 may extend approximately an eighth to a quarter inch above the interior surface 38 of the concave 20.

The configurable rub bars are preferably formed as segmented rub bars. Segmented rub bars mean that the rub bars are formed as straight pieces having a length that does not extend all the way across the frame allowing the straight, segmented pieces to be mounted in a helical fashion to the substantially circumferential helical surface of the grate without bending or twisting of the rub bar or grate. Use of segmented rub bars also eliminates the need for additionally producing complex sheets that, for example, have twists or helical forms to them, and also allows the segmented rub bars to be reversible front to back.

As shown in FIG. 2, the concave 20 includes configurable rub bars 36. As shown, rub bars 36 may be mounted (e.g., bolted) to the interior surface 38 of the concave 20 in a helical fashion to create a rub surface on the smooth inner radius of the concave 20 to provide more aggressive separation of crop passing thereover. Mounting the configurable rub bars 36 in a helical fashion means that the rub bars 36 are mounted such that the length of the rub bar 36 is substantially perpendicular to the helical cutouts 34 and mounting framework 42 (and substantially perpendicular to the spiraling and helical crop flow).

Embodiments of the present invention having configurable rub bars include removable rub bars. For example, a bolted configuration allows the rub bars to be removed and reconfigured on the grate for a particular use or crop.

Although it is preferred in certain embodiments that the rub bars be mounted perpendicular or substantially perpendicular to the crop flow, other embodiments contemplate that the rub bars may be mounted at an angle to the crop flow. For example, in some embodiments, the rub bars may be mounted at an angle of about 85 degrees to about 95 degrees to the direction of crop flow. For example, in other embodiment, the rub bars may be mounted at an angle of about 80 degrees to about 100 degrees to the direction of crop flow. This may result, for example, from the need for adjustments in the speed of the rotor and crop flow through the threshing chamber based on crop type, crop condition, etc., resulting in some angle of incident of the crop hitting the rub bar surrounding 90 degrees. Generally, the closer to perpendicular the rub bars are to crop flow, the more aggressive the threshing.

Alternatively, the rub bars 36 may be mounted (e.g., bolted) to the exterior surface 40 (i.e., on the box side) to cover up cutouts 34 in order to: provide a smoother surface in the interior surface and/or reduce the percent open area by blocking off separation of the rear of the concave. In another embodiment, the configurable rub bars 36 may be mounted to either of the inside and outside surface(s) 38, 40. In yet another embodiment, the configurable rub bars 36 may be mounted to both of the inside and outside surface(s) 38, 40.

Use of a bolted configuration in the mounting of the rub bars 36 to the mounting framework 42 of the grate 24 allows the rub bars 36 to be replaceable (e.g., to replace worn or damaged rub bars 36; to change the type/style of rub bar 36 based, for example, on the crop, etc.). Also, use of a bolted configuration in the mounting of the rub bars 36 to the mounting framework 42 of the grate 24 allows the rub bars to be interchangeable (e.g., on a particular location on a surface 38 or 40 of the grate 24 or between surfaces 38 and 40 of the grate 24). In addition, use of a bolted configuration in the mounting of the rub bars 36 to the mounting framework 42 of the grate 24 allows the rub bars 36 to be scalable (e.g., the number of rub bars 36 may be increased or decreased).

The segmented and configurable rub bars allow a plethora of options and configurations for mounting the rub bars to the grate. For example, the rub bars may be mounted in series on the same side of the grate; mounted back to back (i.e., one on the inside surface and another on the outside surface; mounted in series but alternating front to back; mounted in a pattern on one or both sides of the grate; mounted randomly on one or both sides of the grate; etc. Where rub bars overlap top to bottom, the single bolt may be used to secure an end of two separate rub bars.

In a preferred embodiment, the rub bars 36 comprise U-shaped rub bars. When mounted to the inside surface 38 of the grate 24, the U is facing up, towards the threshing surface of the rotor 12, so that as the crop progresses across the U-shaped rub bar two upset edges 46 are encountered. In the embodiment having the U-shaped rub bars 36 mounted to the exterior surface 40, the rub bar 36 is flipped so that the U is facing outward, away from the rotor 12 and threshing surface, so that crop does not get caught in the channel 48 of the U-shape member. The rub bars may include various shapes. For example, the rub bars may comprise rectangular shaped bars, L-shaped bars, rounded bars, etc. The rub bars may include various shapes and sizes. For example, the rub bars may have a length that span one mounting frame, two mounting frames, threes mounting frames, etc.

Figure 3:
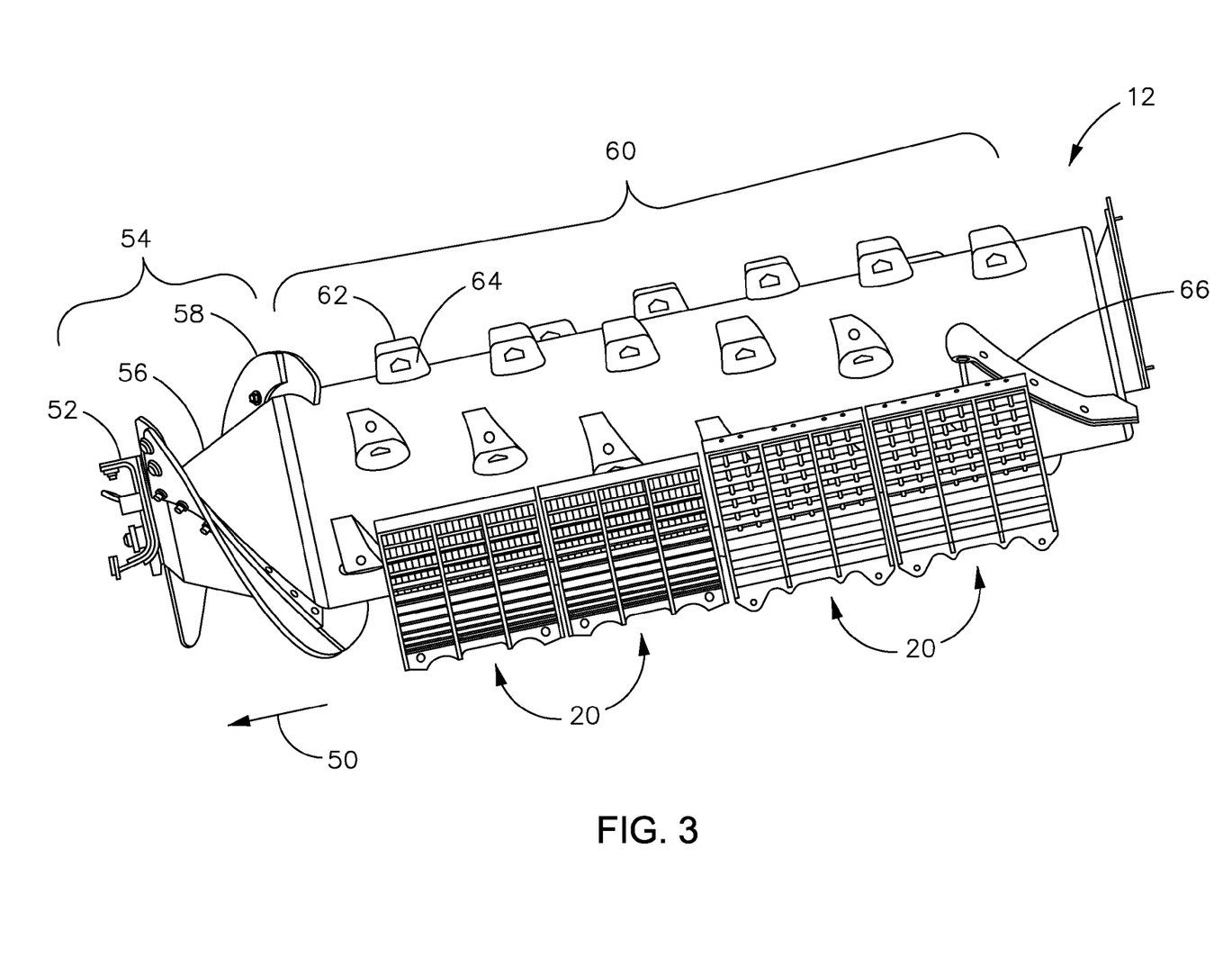
FIG. 3 is a left side view of an exemplary rotor and concave arrangement.
Figure 4:
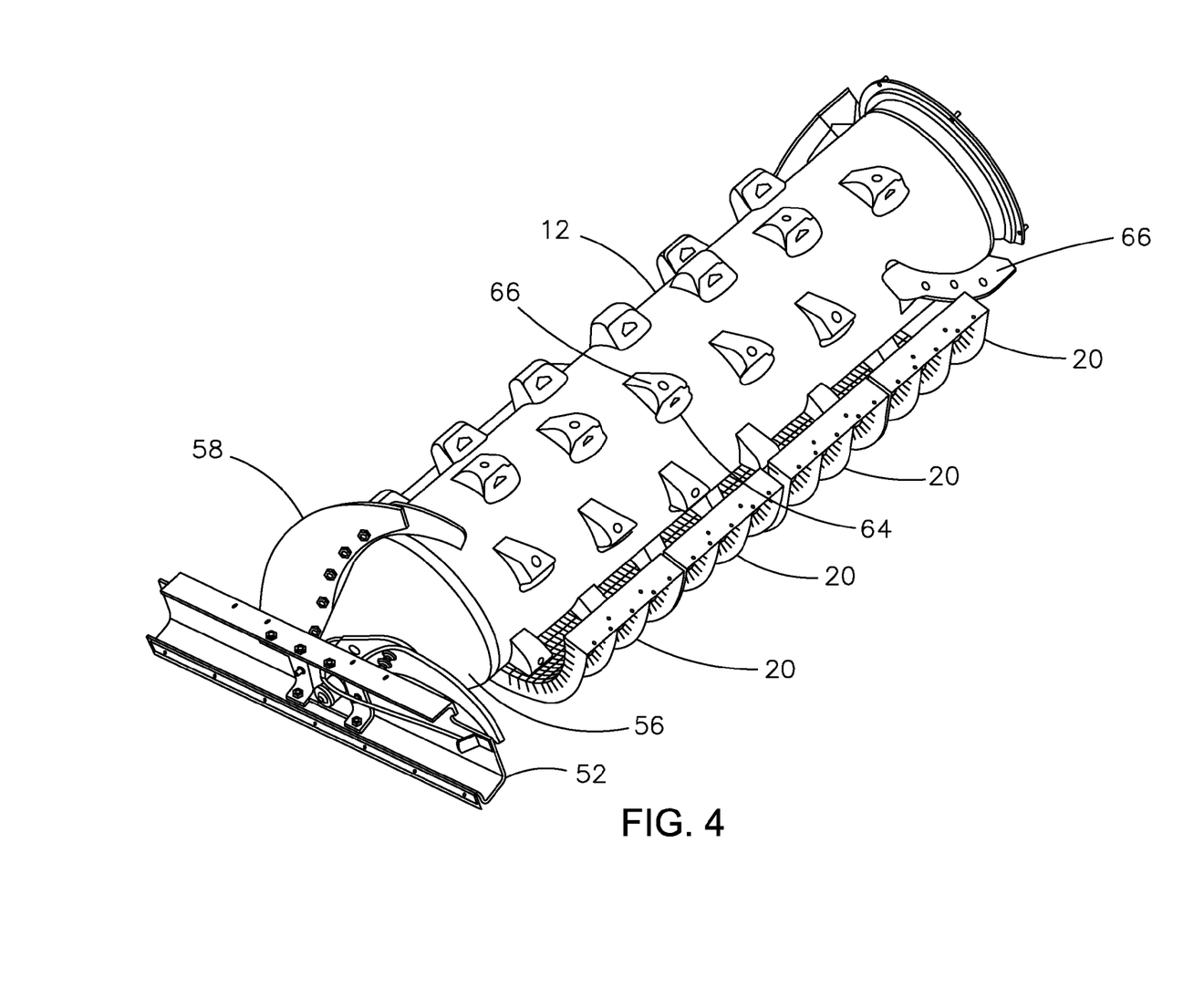
FIG. 4 is a top perspective view of the exemplary rotor and concave arrangement of FIG. 3.

FIGS. 3 and 4 show an exemplary rotor 12 and concave 20 arrangement. As shown, the concaves 20 may be mounting in close proximity to the rotor 12 with a space or clearance therebetween for a crop to flow. In a typical combine 10, an individual concave 20 may wrap approximately 150 to 160 degrees around the rotor 12. The concave 20 may comprise one piece or may be split into multiple parts. For example, the concave may be split into two halves that may be connected together end-to-end to form a full concave. End walls 26 may include one or more openings or holes 27 for receiving a fastener (e.g., a bolt) for connecting the two halves of the concave together (see e.g., FIG. 2). This feature may be advantageous, for example, on larger combines to facilitate handling, installation and removal.

Further, H-frames may be provided for mounting of the concave or concaves. In the embodiment illustrated in FIGS. 3 and 4, two H-frame boxes may be provided having four module positions or mounting locations for receiving individual concaves. A complete combine may include, for example, four left concaves and four right concaves to produce a fully off-setted threshing module.

The concaves may be configurable and interchangeable between positions to allow the combine to work with a variety of threshable crops. The concave modules may be selected and positioned to thresh and separate grain appropriately at a relatively high capacity. For example, the concave in the number 1 position and the number 4 position may be interchangeable and the concaves in the number 2 position and the number 3 position may be interchangeable. Typically, concaves on the right side may be interchangeable with one another (switching position front to back) and concaves on the left side may be interchangeable with one another (switching position front to back). Typically, concaves from the left side may not be exchanged with concaves on the right side due to mounting configurations.

As shown in FIGS. 3 and 4, the front concaves may have a small mounting frame configuration and the back concaves have a larger mounting frame configuration—i.e., more percent open area. Although the concaves shown in FIGS. 3 and 4 show conventional concaves—i.e., having straight wires that are parallel to the frame sidewalls and rub bars that are perpendicular to the frame sidewalls and hence do not have a helical configuration, those skilled in the art will appreciate that the helical bar concave of the present invention (e.g., as shown and described above with reference to FIG. 2) may be mounted in a similar fashion as shown and in place of the illustrated concaves.

FIGS. 3 and 4 show a left side view and a top side view, respectively, of an exemplary rotor 12. As shown, the rotor 12 rotates clockwise when viewed from a position at the rear of the rotor, looking forward to the direction of travel (arrow 50). That is, the illustrated rotor 12 of FIG. 3 is rotating such that the top of the rotor is going into the page and the bottom of the rotor would be coming out of the page.

As shown, the rotor 12 includes a front rotor support 52 at the front (the left side in the figure). The illustrated support includes a front rotor support 52 having a C-channel curvature that holds up and supports the rotor 12. The in-feed area 54 of the rotor is from that bearing support plate or that rotor support channel to the number one module position which is mainly constructed of the conical grey cone 56 and the helical auger plates 58.

After this transition area 54, the crop goes through an acceleration period in which you have a feed device that is feeding crop from the header. The crop is fed at some factor of acceleration, which may depend, for example, on how fast the rotor is spinning and how fast the feeder is going, etc. But generally, there is always an increase in speed of the crop in this regions of the combine. The motion of the rotor 12 also acts to thin the crop and transmits it rearward. The rotor conveys the crop into the thresher section 60 of the rotor, which is the tubular portion. Rasp bars 62 are mounted using conventional techniques (e.g., bolted) to the barnacles or the rasp bar supports 64. The rasp bar supports 64 may be connected using conventional techniques (e.g., welded) to the cylindrical portion of the rotor 12.

In the illustrated rotor arrangement, primarily positions number one and two (also referred to as module positions number one and two) may be adjustable and these modules set the threshing clearance (the distance between the rotor (and rotor rasp bars) and the concave (and concave rub bars)). For example, if you are threshing wheat, one would like to tighten up the clearance due to the small kernel size. For corn, you would want a more open area similar to the height of a cob, and the adjustable feature allows an operator to tailor and adjust for threshing based on the particular crop. This position is where the grinding and threshing action occurs and where most of the grain is threshed.

Positions 3 and 4 may be a fixed arrangement, although these positions are not limited to a fixed arrangement. The area in the number 3 and number 4 module positions are typically called the separation area. Typically, a wider clearance is run in the separation area as compared to the threshing area since by this time the crop is substantially threshed. In the separation area the main objective is simply trying to allow more open area to allow the loose, free grain to escape from the straw and fall through the cutouts or open area of the modules.

The first and second module positions typically have tighter clearances and less percent open area as compared to the third and fourth module positions. The actual clearance for each module position may be determined and set to achieve the desired grind or rub the crop adequately to thresh the grain. This customization and adjustability may be determined based on a number of factors, such as the crop, plant characteristics, the growing seasons, and the like. For example, sometimes it is desirable to run a very wide clearance for wheat, sometimes it is required to run a very tight clearance for hard to thresher wheat.

As shown, a helical kicker 66 may be provided at the rear of the rotor (right side in the figure) to expel the crop out of the threshing chamber. Typically, this expelled material goes either onto the ground or into a collection device, such as a straw chopper or a discharge beater, in which a subsequent action may be taken on the straw. As the crop flows through the threshing chamber, it flows in a cylindrical or spiral pattern as a result of the rotating rotor. When it gets to the rear of the rotor, that rotor ends and so does the crop flow path. The helical kicker 66 helps ensure full discharge of the crop from the threshing chamber.

Embodiments of the present invention also include improved methods of manufacturing a helical bar concave. The method of manufacture includes laser cutting flat metal sheet to form a grate having a helical pattern. The helical pattern includes a plurality of helical mounting frames and helical cutouts in the grate. The cutouts in part forming a percent open area in the concave having a helical geometry. Mounting holes are provided in the grate for mounting (e.g., bolting on) of configurable rub bars. The flat, cut, metal piece may then be rolled to a predetermined radius. The rolled, cut, metal sheet may then be connected (e.g., welded) to a box-shaped frame to form a configurable helical grate. Selectively configuring the configurable helical grate by mounting the configurable rub bars in a helical fashion to one or both of the interior surface and/or the exterior surface of the grate provides improved performance and flexibility in operations.

The combination of laser cutting a grate having helical shape or geometry in combination with configurable rub bars creates a configurable rub surface and a means to: change the aggressiveness of the functional surface of the grate; and/or change the percent open area by reversing the rub bars and mounting them on the back side of the grate to close off one or more cutouts.

In one embodiment, the helical bar concave may be used in applications having requirements to collect an additional quantity of larger crop materials, such as, for example, corn cobs. In order to achieve this objective, it is desirable to have more open area within the concave module. The design and construction of embodiments of the present invention allow efficient threshing and separation of larger crop materials by providing a helical bar concave having a substantially greater open area.

At the same time, embodiments of the present invention are configurable and scalable in that the bolted bar design and construction allows one to adjust the number and position of the rub bars thereby easily changing the concave's configuration and threshing/separating characteristics. For example, more or less open area may be provided simply by changing the number, orientation, or location of the rub bars. In addition to changing the number and/or location of the rub bars, the clearance between the balloon helical cutouts in the concave grate may be used to set the percent open area. For example, more or less open area may be provided simply by changing the amount of laser cutting from the part.

The number, orientation, and location of the rub bars, as well as the percent open area in the grate may be determined based upon a functional objective of a particular user. For example, this determination may be based on factors such as, for example, crop type, nature of the crop, plant maturity, moisture content, weather conditions, what you want to allow to pass through the concave module (e.g., free grain, grain and some waste, etc.), etc. The objective may include a feed product, a grain product, and the like. As way of example, wheat and other small grains will typically have relatively small crop residue components that require a smaller percent open area, whereas other grains, such as corn, will typically have larger components, such as thick stalk segments, cob fragments, and large leaves that dictate a larger percent open area in the concave grate.

Part of the motivation for the present invention comes from wanting to be able to separate even the larger pieces of material by achieving even larger percent open areas in the concaves. In one embodiment, this may be achieved by forming longer unobstructed openings. For example, larger percent open areas in the concaves may provide advantages for separating pieces of cob (e.g., 1-inch diameter and 2-3-inch length) along with some of the kernel or grain (e.g., ¼-inch-⅜-inch generally square shape with ⅛-inch thickness). Larger percentage open areas may be achieved, for example, by making larger laser cuts and/or unbolting and removal of bolted-on rub bars. The removable design of the rub bars allows tailoring of the size of the separation area. Embodiments of the present invention provide the ability to create a significant amount of open area with a very low cost construction. The present invention may be manufactured by laser cutting and rolling a flat sheet of metal, thereby reducing/eliminating the need to laser cut and then weld each piece resulting in reduced steps and costs. Another motivating factor for the present invention was the desire to create improved threshing and separation in a helical fashion. Yet another motivation for the present invention was the desire to create a bumpy ride for the crop as it travels over the concave and the rub bars to cause agitation and rubbing of the crop resulting in improved separation of the grain from the waste material. Embodiments of the helical bar concave and method of manufacturing same satisfy the above needs, as well as other needs.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed:

1. A helical bar concave comprising:
a frame having two side walls and two end walls connected together to define a top opening, the two side walls comprising a top edge having a radius;
a grate connected to top edges of the side walls and end walls over the top opening of the frame, the grate having an inside radius conforming to the radius of the top edges of the side walls;
a functional surface on the interior surface of the grate for contacting a crop;
elongate cutouts extending substantially the length of the inside radius in the grate defining a percent open area, the cutouts arranged in a helical geometry to form a substantially circumferential helical functional surface;
helical mounting framework in the grate separating the cutouts;
wherein when the helical bar concave is mounted in a threshing and separation system, the helical geometry of the helical cutouts and helical mounting framework is generally in the same direction, and parallel to a flow path of a spiraling crop flow; and
rub bars mounted to a surface of the grate and connected to the mounting framework,
wherein the rub bars are mounted to the grate in a helical fashion meaning that the rub bars are mounted such that a length of each of the rub bars is substantially perpendicular to the helical cutouts and helical mounting framework.

2. The helical bar concave of claim 1, wherein the rub bars comprise configurable rub bars, wherein the configurable rub bars may be mounted to one or both of:
the interior surface to create a rub surface; and
an exterior surface of the grate to cover-up one or more cutouts and reduce the percent open area.

3. The helical bar concave of claim 2, further comprising:
holes in the mounting framework;
corresponding holes in the rub bars; and fasteners extending through the holes in the mounting framework and the holes in the rub bars to connect the rub bars to the grate.

4. The helical bar concave of claim 3, wherein the configurable rub bars and fasteners comprise a bolted configuration.

5. The helical bar concave of claim 1, wherein the rub bars further comprise U-shaped rub bars, each of the U-shaped rub bars comprising:
a rectangular shaped channel having two side edges and two ends; and
two upset edges extending at an angle from the side edges of the channel.

6. The helical bar concave of claim 5, wherein the U-shaped rub bars are mounted to the interior surface of the grate and the U is facing up, towards the threshing surface of a rotor.

7. The helical bar concave of claim 1, wherein the rub bars comprise segmented rub bars, the segmented rub bars comprising straight pieces having a length that does not span the width of the concave allowing the segmented straight rub bar to be mounted to a surface of the grate in a helical fashion without bending or twisting of the rub bar or grate.

8. The helical bar concave of claim 7, wherein the segmented rub bars only span two mounting frames of the mounting framework.

9. The helical bar concave of claim 7, wherein the segmented rub bars only span three mounting frames of the mounting framework.

10. The helical bar concave of claim 7, wherein the helical cutouts comprise balloon-shaped helical cutouts.

11. The helical bar concave of claim 1, wherein grate comprises a laser cut construction of a flat metal sheet to form the helical cutouts, the cut metal sheet being rolled to form the inside radius of the grate.

12. The helical bar concave of claim 1, wherein the segmented rub bars are mounted at an angle relative to the helical cutouts and helical mounting framework.

13. An agricultural combine having an improved helical bar concave comprising:
an axially arranged threshing and separation system;
a threshing chamber extending axially within the threshing and separation system;
a cylindrical threshing rotor supported and rotatable in a predetermined direction about a rotational axis in the threshing and separation system for conveying a flow of crop material in a helical flow path through the threshing chamber extending circumferentially around the rotor;
a helical bar concave extending circumferentially around a portion of the rotor in a spaced apart relationship to allow the flow of crop to pass in the space between the spinning rotor and the concaves, the helical bar concave comprising:
a frame having walls defining a top opening;
a grate connected over the top opening of the frame, the grate having an inside radius that substantially conforms to the curvature of the rotor;
a functional surface on the interior surface of the grate for contacting a crop;
elongate cutouts extending substantially the length of the inside radius in the grate defining a percent open area, the cutouts arranged in a helical geometry to form a substantially circumferential helical functional surface;
helical mounting frames in the grate separating the cutouts;
wherein when the helical bar concave is mounted in the threshing and separation system, the helical geometry of the helical cutouts and helical mounting frames is generally in the same direction, and parallel to a flow path of a spiraling crop flow; and
rub bars mounted to a surface of the grate and connected to the mounting frames,
wherein the rub bars are mounted to the grate in a helical fashion meaning that the rub bars are mounted such that a length of each of the rub bars is substantially perpendicular to the helical cutouts and helical mounting frames.

14. The agricultural combine of claim 13, wherein the rub bars comprise configurable rub bars, wherein the configurable rub bars may be removably mounted to one or both of:
the interior surface to create a rub surface; and
an exterior surface of the grate to cover-up one or more cutouts and reduce the percent open area.

15. The agricultural combine of claim 14, further comprising:
holes in the mounting frames;
corresponding holes in the rub bars; and
fasteners extending through the holes in the mounting frames and the holes in the rub bars to connect the rub bars to the grate.

16. The agricultural combine of claim 13, wherein the rub bars further comprise Unshaped rub bars, each of the U-shaped rub bars comprising:
a rectangular shaped channel having two side edges and two ends; and
two upset edges extending at an angle from the side edges of the channel.

17. The agricultural combine of claim 16, wherein the U-shaped rub bars are mounted to the interior surface of the grate and the U is facing up, towards the threshing surface of the rotor.

18. The agricultural combine of claim 13, wherein the rub bars comprise segmented rub bars, the segmented rub bars comprising straight pieces having a length that does not span the width of the concave allowing the segmented straight rub bars to be mounted to a surface of the grate in a helical fashion without bending or twisting of the rub bar or grate.

* * * * *